United States Patent
Yaron et al.

(10) Patent No.: US 12,443,397 B2
(45) Date of Patent: Oct. 14, 2025

(54) TECHNIQUES FOR CODE FINGERPRINTING

(71) Applicant: Dazz, Inc., San Francisco, CA (US)

(72) Inventors: Eshel Yaron, Amsterdam (NL); Barak Bercovitz, Even-Yehuda (IL); Tomer Schwartz, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/169,671

(22) Filed: Apr. 3, 2025

(65) Prior Publication Data
US 2025/0278255 A1    Sep. 4, 2025

Related U.S. Application Data

(63) Continuation of application No. 18/593,470, filed on Mar. 1, 2024.

(51) Int. Cl.
*G06F 8/36* (2018.01)
*G06F 8/35* (2018.01)

(52) U.S. Cl.
CPC . *G06F 8/36* (2013.01); *G06F 8/35* (2013.01)

(58) Field of Classification Search
None
See application file for complete search history.

(56) References Cited

U.S. PATENT DOCUMENTS

| | | | | |
|---|---|---|---|---|
| 8,806,425 B1 * | 8/2014 | Willis | ................ | G06F 8/35 717/106 |
| 9,052,961 B2 * | 6/2015 | Mangtani | ............. | G06F 9/5077 |
| 9,449,042 B1 * | 9/2016 | Evans | ................ | G06F 8/36 |
| 10,108,803 B2 | 10/2018 | Chari et al. | | |
| 11,429,353 B1 | 8/2022 | Liguori et al. | | |
| 11,893,106 B2 | 2/2024 | Kim et al. | | |

(Continued)

FOREIGN PATENT DOCUMENTS

| | | |
|---|---|---|
| EP | 3208996 A1 | 8/2017 |
| EP | 3494506 A1 | 6/2019 |
| WO | 2023067423 A1 | 4/2023 |

OTHER PUBLICATIONS

Alrabaee, "A Survey of Binary Code Fingerprinting Approaches: Taxonomy, Methodologies, and Features", 2022, ACM (Year: 2022).*

(Continued)

*Primary Examiner* — Hossain M Morshed
(74) *Attorney, Agent, or Firm* — M&B IP Analysts, LLC

(57) ABSTRACT

A system and method for code fingerprinting. A method includes scanning a code repository including software components by executing fingerprinting code on the code repository in order to generate statistics vectors for the software components. The fingerprinting code includes instructions for performing a text search to identify instances of patterns in the code repository and to generate the statistics vectors based on the identified pattern instances. The statistics vectors are clustered with respect to groupings of software components. The statistics vectors are aggregated by combining values of respective statistics in the statistics vectors belonging to the same clusters. An anomaly is detected based on the aggregated statistics vectors. One or more remedial actions are performed with respect to the software components based on the detected anomaly.

19 Claims, 5 Drawing Sheets

(56) References Cited

U.S. PATENT DOCUMENTS

| | | | |
|---|---|---|---|
| 2003/0131284 A1* | 7/2003 | Flanagan | G06F 8/75 717/126 |
| 2009/0222479 A1 | 9/2009 | Burukhin et al. | |
| 2010/0070448 A1 | 3/2010 | Omoigui | |
| 2013/0167241 A1* | 6/2013 | Siman | G06F 16/245 726/25 |
| 2015/0341214 A1* | 11/2015 | Croy | H04L 41/16 709/221 |
| 2015/0347759 A1 | 12/2015 | Cabrera et al. | |
| 2015/0363197 A1 | 12/2015 | Carback et al. | |
| 2016/0379480 A1 | 12/2016 | OlmstedThompson et al. | |
| 2017/0075749 A1 | 3/2017 | Ambichl et al. | |
| 2017/0185785 A1 | 6/2017 | Vorona et al. | |
| 2017/0249128 A1 | 8/2017 | Fojtik et al. | |
| 2017/0286692 A1 | 10/2017 | Nakajima et al. | |
| 2018/0025160 A1 | 1/2018 | Hwang et al. | |
| 2018/0129479 A1 | 5/2018 | McPherson et al. | |
| 2018/0285199 A1 | 10/2018 | Mitkar et al. | |
| 2018/0321918 A1 | 11/2018 | Mcclory et al. | |
| 2018/0373507 A1 | 12/2018 | Mizrahi et al. | |
| 2019/0007290 A1 | 1/2019 | He et al. | |
| 2019/0068622 A1 | 2/2019 | Lin et al. | |
| 2019/0294477 A1* | 9/2019 | Koppes | G06F 9/5072 |
| 2019/0303579 A1 | 10/2019 | Reddy et al. | |
| 2019/0354389 A1 | 11/2019 | Du et al. | |
| 2020/0097662 A1 | 3/2020 | Hufsmith et al. | |
| 2020/0183766 A1 | 6/2020 | Kumar-Mayernik et al. | |
| 2020/0296117 A1 | 9/2020 | Karpovsky et al. | |
| 2021/0042096 A1 | 2/2021 | White, III et al. | |
| 2021/0168165 A1 | 6/2021 | Alsaeed et al. | |
| 2021/0182387 A1 | 6/2021 | Zhu et al. | |
| 2021/0311855 A1 | 10/2021 | Khan et al. | |
| 2021/0382997 A1 | 12/2021 | Yi et al. | |
| 2022/0114023 A1 | 4/2022 | Choksi et al. | |
| 2022/0129539 A1 | 4/2022 | Walsh et al. | |
| 2022/0311794 A1 | 9/2022 | Maya et al. | |
| 2022/0327220 A1 | 10/2022 | Sharma et al. | |
| 2022/0353341 A1 | 11/2022 | Östrand et al. | |
| 2023/0036739 A1 | 2/2023 | Deppisch et al. | |
| 2023/0118065 A1 | 4/2023 | Kumar | |
| 2023/0130649 A1 | 4/2023 | Schwartz et al. | |
| 2023/0229781 A1 | 7/2023 | Stolbikov et al. | |
| 2023/0297366 A1 | 9/2023 | Wigglesworth et al. | |
| 2023/0333845 A1 | 10/2023 | Zand et al. | |
| 2025/0013442 A1* | 1/2025 | Hempstead | G06F 8/42 |

OTHER PUBLICATIONS

Liu, "VFDETECT: A Vulnerable Code Clone Detection System Based on Vulnerability Fingerprint", 2017, IEEE (Year: 2017).*

Doan TP, Jung S. DAVS: Dockerfile Analysis for Container Image Vulnerability Scanning. CMC-Computers Materials & Continua. Jan. 1, 2022;72(1):1699-711. Jan. 1, 2022 (Jan. 1, 2022).

International Search Report for PCT Application No. PCT/IB2022/059483. The International Bureau of WIPO.

International Search Report for PCT application PCT/IB2023/052413 dated Jun. 12, 2023. The International Bureau of WIPO.

International Search Report for PCT/IB2023/057511, dated Nov. 2, 2023. Searching Authority Israel Patent Office, Jerusalem, Israel.

International Search Report, PCT/IB2023/052415; Israel Patent Office, Jerusalem. Dated Jun. 14, 2023.

Written Opinion of the International Searching Authority for PCT Application No. PCT/IB2022/059483 dated Jan. 8, 2023. The International Bureau of WIPO.

Written Opinion of the International Searching Authority, PCT/IB2023/052415. Israel Patent Office, Jerusalem. Dated Jun. 14, 2023.

Written Opinion of the Searching Authority for PCT application PCT/IB2023/052413 dated Jun. 12, 2023. The International Bureau of WIPO.

Written Opinion of the Searching Authority for PCT/IB2023/057511, dated Nov. 2, 2023. Searching Authority Israel Patent Office, Jerusalem, Israel.

International Search Report for PCT/IB2025/051650, dated May 26, 2025. Searching Authority, Israel Patent Office, Jerusalem, Israel.

Written Opinion of the Searching Authority for PCT/IB2025/051650, dated May 26, 2025. Searching Authority, Israel Patent Office, Jerusalem, Israel.

* cited by examiner

TECHNIQUES FOR CODE FINGERPRINTING

CROSS-REFERENCE TO RELATED APPLICATIONS

This application is a continuation of U.S. patent application Ser. No. 18/593,470 filed on Mar. 1, 2024, now pending, the contents of which are hereby incorporated by reference.

TECHNICAL FIELD

The present disclosure relates generally to scanning in cybersecurity, and more specifically to techniques for efficiently scanning files in repositories.

BACKGROUND

In cybersecurity, scanning is a process for inspecting systems, applications, and networks to find potential flaws, incorrect setups, or vulnerabilities. Prompt and frequent scanning may prove to be very valuable for entities seeking to protect data and systems, as scanning regularly may allow for catching potential cyber threats early, either before they successfully exploit a vulnerability or misconfiguration, or otherwise in a way that minimizes damage from such an exploit or abuse of misconfiguration.

Techniques for scanning more efficiently would aid in reducing use of computing resources required for cybersecurity activities as well as allow for reducing the time to detect potential cyber threats, thereby improving cybersecurity within computing environments. Accordingly, such efficient scanning techniques are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for code fingerprinting. The method comprises: scanning a code repository including a plurality of software components by executing fingerprinting code on the code repository in order to generate a plurality of statistics vectors for the plurality of software components, wherein each statistics vector includes a plurality of values representing statistics for respective aspects of a corresponding software component of the plurality of software components, wherein the fingerprinting code includes instructions that configure a processing circuitry to perform a text search in order to identify instances of patterns in the code repository and to generate the plurality of statistics vectors based on the identified instances of patterns when the fingerprinting code is executed; clustering the plurality of statistics vectors into a plurality of clusters defined with respect to a plurality of software component groupings, wherein each cluster of the plurality of clusters includes a subset of the plurality of statistics vectors of corresponding to a subset of the plurality of software components which belongs to one of the plurality of software component groupings; aggregating the plurality of statistics vectors into a plurality of aggregated statistics vectors by combining values of respective statistics in statistics vectors among the plurality of statistics vectors belonging to a same cluster of the plurality of clusters; detecting at least one anomaly based on the plurality of aggregated statistics vectors; and performing at least one remedial action with respect to the plurality of software components based on the detected at least one anomaly.

Certain embodiments disclosed herein also include a non-transitory computer readable medium having stored thereon causing a processing circuitry to execute a process, the process comprising: scanning a code repository including a plurality of software components by executing fingerprinting code on the code repository in order to generate a plurality of statistics vectors for the plurality of software components, wherein each statistics vector includes a plurality of values representing statistics for respective aspects of a corresponding software component of the plurality of software components, wherein the fingerprinting code includes instructions that configure a processing circuitry to perform a text search in order to identify instances of patterns in the code repository and to generate the plurality of statistics vectors based on the identified instances of patterns when the fingerprinting code is executed; clustering the plurality of statistics vectors into a plurality of clusters defined with respect to a plurality of software component groupings, wherein each cluster of the plurality of clusters includes a subset of the plurality of statistics vectors of corresponding to a subset of the plurality of software components which belongs to one of the plurality of software component groupings; aggregating the plurality of statistics vectors into a plurality of aggregated statistics vectors by combining values of respective statistics in statistics vectors among the plurality of statistics vectors belonging to a same cluster of the plurality of clusters; detecting at least one anomaly based on the plurality of aggregated statistics vectors; and performing at least one remedial action with respect to the plurality of software components based on the detected at least one anomaly.

Certain embodiments disclosed herein also include a system for code fingerprinting. The system comprises: a processing circuitry; and a memory, the memory containing instructions that, when executed by the processing circuitry, configure the system to: scan a code repository including a plurality of software components by executing fingerprinting code on the code repository in order to generate a plurality of statistics vectors for the plurality of software components, wherein each statistics vector includes a plurality of values representing statistics for respective aspects of a corresponding software component of the plurality of software components, wherein the fingerprinting code includes instructions that configure a processing circuitry to perform a text search in order to identify instances of patterns in the code repository and to generate the plurality of statistics vectors based on the identified instances of patterns when the fingerprinting code is executed; cluster the plurality of statistics vectors into a plurality of clusters defined with respect to a plurality of software component groupings, wherein each cluster of the plurality of clusters includes a subset of the plurality of statistics vectors of corresponding to a subset of the plurality of software components which belongs to one of the plurality of software component groupings; aggregate the plurality of statistics vectors into a plurality of aggregated statistics vectors by combining values of respective statistics in statistics vectors among the plurality of statistics vectors belonging to a same cluster of the plurality of clusters; detect at least one anomaly based on the plurality of aggregated statistics vectors; and perform at least one remedial action with respect to the plurality of software components based on the detected at least one anomaly.

Certain embodiments disclosed herein include the method, non-transitory computer readable medium, or system noted above, wherein the fingerprinting code is generated based on a knowledge base including a plurality of nodes representing respective software components of the plurality of software components, wherein the patterns are defined with respect to the knowledge base.

Certain embodiments disclosed herein include the method, non-transitory computer readable medium, or system noted above, further including or being configured to perform the following step or steps: querying the knowledge base in order to obtain query results; and generating the fingerprinting code is based on the query results.

Certain embodiments disclosed herein include the method, non-transitory computer readable medium, or system noted above, wherein the knowledge base is queried for at least one string of text of the plurality of nodes of the plurality of software components represented in the knowledge base, wherein the patterns are defined with respect to the at least one string of text.

Certain embodiments disclosed herein include the method, non-transitory computer readable medium, or system noted above, wherein the knowledge base is queried in a first query, wherein the query results are a first set of query results, wherein the plurality of statistics vectors is a first plurality of statistics vectors, wherein the at least one anomaly is at least one first anomaly, further including or being configured to perform the following step or steps: updating the fingerprinting code by querying the knowledge base in a second query in order to obtain a second set of query results and regenerating the fingerprinting code based on the second set of query results; scanning the code repository using the updated fingerprinting code in order to generate a second plurality of statistics vectors; and detecting at least one second anomaly based on the second plurality of statistics vectors.

Certain embodiments disclosed herein include the method, non-transitory computer readable medium, or system noted above, wherein the knowledge base includes data of code of the plurality of software components, wherein the patterns are defined further with respect to the data of the code of the plurality of software components.

Certain embodiments disclosed herein include the method, non-transitory computer readable medium, or system noted above, wherein the patterns are patterns in text, wherein the fingerprinting code includes instructions that, when executed by a processing circuitry, configure the processing circuitry to perform at least one text search.

Certain embodiments disclosed herein include the method, non-transitory computer readable medium, or system noted above, fwherein the plurality of statistics vectors include a plurality of counts vectors, wherein each of the plurality of values of each counts vector is a count of instances for a respective aspect of the plurality of software components represented in the knowledge base.

Certain embodiments disclosed herein include the method, non-transitory computer readable medium, or system noted above, further including or being configured to perform the following step or steps: applying a machine learning model to the plurality of aggregated statistics vectors in order to obtain a set of machine learning model outputs, wherein the machine learning model is trained using training statistical data for a knowledge base including a plurality of nodes representing respective software components of the plurality of software components, wherein the machine learning model is trained to output anomalies when applied to the plurality of aggregated statistics vectors, wherein the at least one anomaly is detected based on the set of machine learning model outputs.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
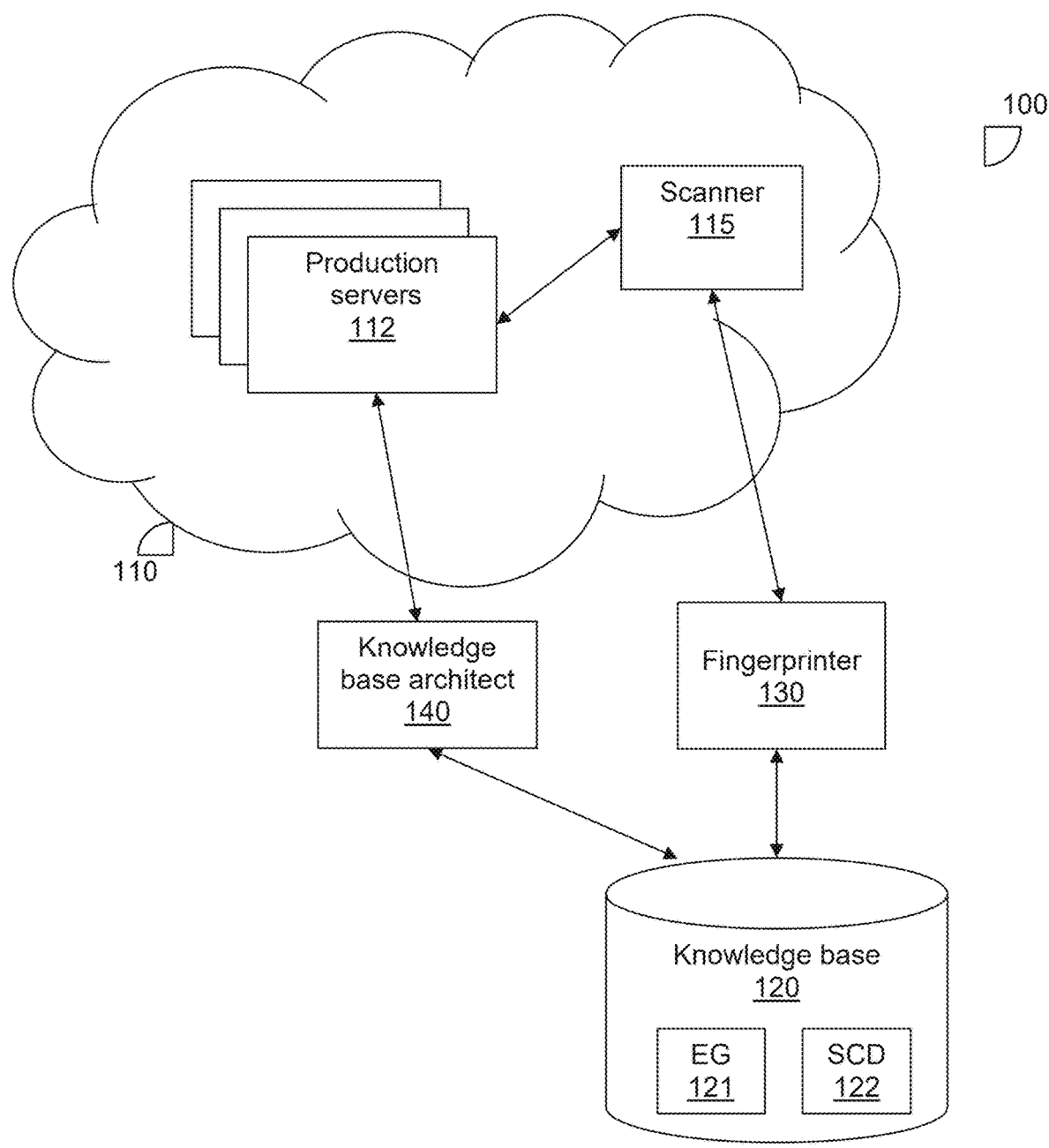
FIG. 1 is a network diagram utilized to describe various disclosed embodiments.

The various disclosed embodiments include methods and systems for fingerprinting computer code as well as various techniques for utilizing fingerprinting in order to secure computing environments against potential cyber threats. More specifically, various disclosed embodiments provide techniques which can be utilized to auto-generate fingerprinting code which, when executed, configures a system to identify instances of fingerprints and to generate statistical information about fingerprint appearances.

In an embodiment, fingerprinting code is generated based on a knowledge graph including nodes representing software components deployed in a computing environment such as, but not limited to, infrastructure as code (IaaC) components. The fingerprinting code contains instructions that, when executed by a system, configure the system to search for instances of patterns (e.g., patterns in text such as particular text segments) corresponding to respective aspects of the knowledge graph and to generate statistical data about instances of the patterns found during the search. Accordingly, the fingerprinting code effectively encodes information represented in the knowledge graph.

Different statistics among the statistical data collectively define a fingerprint which can be analyzed and compared to other fingerprints in order to, for example, detect anomalous behavior. To this end, in an embodiment, the statistical data is represented as counts vectors, where each counts vector includes a set of values representing aspects of nodes among the knowledge graph. Each counts vector therefore effectively embeds all or part of a code repository into vector space, and may therefore serve as a fingerprint unique to that code repository defined with respect to particular aspects which may be reflected in data among that code repository.

Once the fingerprinting code has been generated, code repositories are scanned by running the fingerprinting code. As noted above, the fingerprinting code contains instructions for identifying instances of patterns corresponding to different aspects which may be of interest (e.g., aspects which the knowledge graph was queried for) and to generate statistics about those identified instances of patterns. Results of the scanning are utilized to generate statistics vectors such as, but not limited to, counts vectors, which can be utilized as fingerprints and analyzed in order to detect anomalous behavior or configurations.

In some embodiments, the counts vectors may be clustered, for example with respect to particular groups of software components (e.g., components of the same developer, components in the same code repository, etc.). In some implementations, a machine learning model may be trained based on historical statistics vectors and applied to the statistics vectors in order to detect potential anomalies. Alternatively or in combination, anomalies may be detected using predetermined anomaly detection rules based on the statistics vectors. Remedial actions may be performed with respect to any detected anomalies in order to prevent or otherwise mitigate potential cyber threats reflected in the statistics vectors.

In an embodiment, generating the fingerprinting code includes querying a knowledge graph and identifying patterns corresponding to respective connections between nodes in the knowledge graph. More specifically, the patterns may be text patterns in forms such as text segments identified in the knowledge graph. The text patterns may be at least partially defined with respect to queries used to query the knowledge graph.

As a non-limiting example, when the knowledge graph is queried for file extensions and types of files, the text patterns may include text segments indicating file extensions and types of files for files of components indicated in code repositories. In a further example, the counts vectors includes values representing counts of respective file extensions such that the numbers of instances of files having the respective file extensions collectively serve as a fingerprint for a portion of the code repository which was analyzed in which the fingerprint is defined with respect to file extensions. Accordingly, counts vectors may be utilized to uniquely identify at least a portion of a code repository with respect to particular aspects of the code contained therein, which in turn may be utilized to detect abnormalities or otherwise compare between code repositories.

The disclosed embodiments provide various benefits in terms of efficiently analyzing code repositories in order to characterize the code contained therein.

There are existing solutions for analyzing code such as static code scanners and machine learning models (e.g., large language models) trained to "understand" code. However, these existing solutions face various challenges. Some of the static code scanning solutions are only capable of identifying predefined patterns of known common vulnerabilities and exposures (CVEs), and are therefore incapable of learning or analyzing new patterns.

Some of the machine learning solutions are powerful but face challenges in reliably extracting meaningful information for subsequent action. In other words, these solutions can identify patterns in a sophisticated manner, but are incapable of analyzing the meaning of these patterns. Additionally, solutions utilizing large language models (LLMs) are slow and costly in terms of computing resources. In particular, LLMs often run on remote specialized hardware (e.g., specialized hardware deployed in a cloud environment) which are slow and limited by upload rates, as well as utilizing a significant amount of processing power in order to run on large amounts of files and commits across many different code repositories.

The disclosed embodiments provide a fingerprinting process which can provide scanning results that allow for meaningful comparisons. Moreover, various disclosed embodiments can be realized using a simple text search and statistical analysis of text search results, thereby providing the meaningful scanning results in a manner that can be run quickly and efficiently in terms of computing resources.

In particular, a simple text search may be performed much more quickly than parsing code or applying a LLM. Additionally, the statistical analysis as described herein can be realized via basic counting rather than complex language analysis as would be performed by a LLM, where the counting results can be quickly and efficiently written to a memory of the system running the fingerprinting code rather than being written to a separate database. Further, the counting results utilize less memory than more complex results while maintaining meaning. Thus, the disclosed embodiments provide an improved scanning process which can be performed quickly and using fewer computing resources than certain existing solutions while maintaining meaningful results which can be used for subsequent processing.

Even further, using a knowledge base as described herein in order to generate the fingerprinting code automatically. That is, the knowledge base may be queried in order to obtain data about code of software components represented therein with respect to a particular aspects (as a non-limiting example, file extensions). The data obtained by querying the knowledge base can be analyzed to identify patterns therein, which in turn can be leveraged to automate generation of code to search for these patterns. In this regard, it is noted that writing code to scan code repositories manually present various challenges due to human error and the reliance on subjective judgments about which patterns are "interesting" or otherwise defining the specific patterns to be identified during the scanning. Even when a user writing code manually has access to a knowledge base of software components as described herein, that user must manually evaluate results of querying the knowledge base and make subjective judgments about defining patterns to be scanned for in code repositories. The disclosed embodiments provide an objective process which can be effectively automated in order to produce consistent results in an efficient manner.

Moreover, by generating the fingerprinting code using results from querying a knowledge base as described herein, the fingerprinting code can be automatically updated based on changes in the knowledge base. That is, when fingerprinting code related to the same aspects of code is to be run in subsequent iterations, the knowledge base may be queried with respect to these aspects of code, and results of such querying may differ depending on changes to the knowledge base that have occurred since prior iterations. In this regard, the fingerprinting code can be regenerated using the new query results, thereby automatically updating the fingerprinting code in accordance with the changes to the knowledge base.

FIG. 1 shows an example network diagram 100 utilized to describe the various disclosed embodiments. The example network diagram 100 illustrates a cloud computing platform 110, a knowledge base 120, a fingerprinter 130, and a knowledge base architect 140. The cloud computing platform 110 may be realized via one or more networks such as, but not limited to, a wireless, cellular or wired network, a local area network (LAN), a wide area network (WAN), a metro area network (MAN), the Internet, the worldwide web (WWW), similar networks, and any combination thereof.

The cloud computing platform 110 includes production servers 112 and one or more scanners 115. The production servers 112 may be configured to deploy and host web applications uploaded to the cloud computing platform 110 by one or more software developer devices (not shown). The scanners 115 are configured to scan the cloud computing platform 110, binary artifacts, code, combinations thereof, and the like, and are configured to generate cybersecurity event data related to network activity, potential sources of cybersecurity events, intermediate representations of such potential sources, resulting artifacts of the software development process, combinations thereof, and the like. To this end, the scanners 115 may include, but are not limited to, cloud scanners, application security scanners, linting tools, combinations thereof, and any other security validation tools that may be configured to monitor network activities or potential sources of cybersecurity events.

Any cloud scanners among the scanners 115 are configured to monitor for network activities and are configured to generate sources of cybersecurity event data. To this end, such cloud scanners may be configured to monitor network activity and to generate logs of such network activity, or may be configured to monitor suspicious behavior and to generate alerts when such suspicious behavior is identified. The alerts may include information about the events, entities, or both, that triggered the alerts.

The cybersecurity event data included in the cybersecurity event data sources may be provided, for example, in the form of textual data. Such textual data may be analyzed using natural language processing and a semantic concepts dictionary in order to identify entity-identifying values representing specific entities in software infrastructure which are related to the cybersecurity events, semantic concepts indicating types or other information about entities related to the cybersecurity events, both, and the like.

The knowledge base 120 stores data used for cybersecurity event remediation. Such data includes, but is not limited to, an entity graph (EG) 121 and a semantic concepts dictionary (SCD) 122. The entity graph 121 is a graph linking nodes representing entity-identifying values of specific entities such as, but not limited to, resource names, unique identifiers, and the like. The semantic concepts dictionary 122 includes definitions of semantic concepts indicating semantic information about entities such as, but not limited to, types of entities (e.g., Docker container).

In some implementations, the entity graph 121 provides an end-to-end view of all domains of the software infrastructure including connections between components of those domains, thereby establishing potential connections between any two given components in the software infrastructure and their respective domains. To this end, the entity graph 121 may include schematic data linking different domains and demonstrating linkages within each domain. The domains include domains representing various layers of the software infrastructure as well as domains representing event logic components (e.g., policies, code defining business logic, queries, etc.) related to cybersecurity events. By graphing domains including both portions of the software infrastructure and event logic components related to cybersecurity events which may be triggered with respect to the software infrastructure, the entity graph 121 can be queried in order to determine paths of nodes connecting entities to event logic components, thereby establishing the root cause of any given cybersecurity event as the entity connected to the event logic components related to the cybersecurity event.

In an embodiment, the fingerprinter 130 is configured to generate and run fingerprinting code as described herein. In accordance with various disclosed embodiments, such fingerprinting code effectively encodes at least a portion of the knowledge base 120 such as the entity graph 121. As discussed herein the fingerprinting code includes instructions that, when executed by a processing circuitry (e.g., a processing circuitry of the fingerprinter 130, not shown in FIG. 1), configures the processing circuitry to scan one or more code repositories and to generate statistics vectors with respect to textual samples (e.g., counts of numbers of instances of each sample) in the code repositories. The fingerprinter 130 may be further configured to detect anomalies based on the statistics vectors, to perform remedial actions in order to remediate such anomalies, and the like.

In an embodiment, the knowledge base architect 140 is configured to populate the knowledge base 120 with data to be used by the fingerprinter 130 including, but not limited to, the entity graph 121 and the semantic concepts dictionary 122. An example method for creating a knowledge base which may be performed by the knowledge base architect 140 is described further below with respect to FIG. 4.

An example hardware layer which may be utilized by the fingerprinter 130, the knowledge base architect 140, or both, is described further below with respect to FIG. 5.

It should be noted that the example network diagram depicted in FIG. 1 illustrates a particular arrangement of communicating components merely for simplicity purposes, but that the disclosed embodiments are equally applicable to different cloud computing configurations. As a non-limiting example, any of the knowledge base 120, the fingerprinter 130, and the knowledge base architect 140 may be deployed in the cloud computing platform 110 without departing from the scope of the disclosure. Additionally, the monitored software may be deployed in an infrastructure other than a cloud computing infrastructure such as, but not limited to, an on-premises infrastructure.

Figure 2:
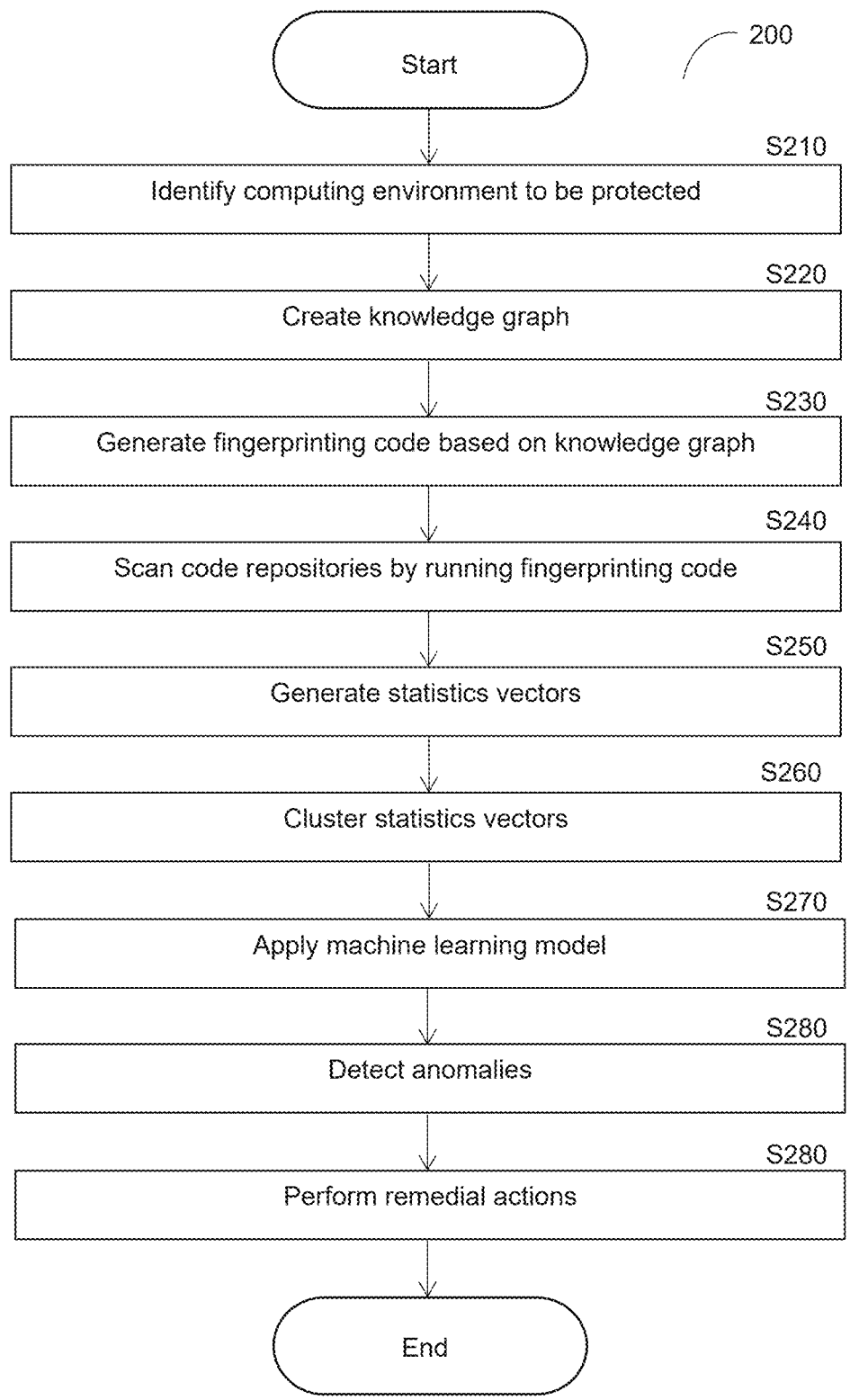
FIG. 2 is a flowchart illustrating a method for mitigating cyber threats using code fingerprinting according to an embodiment.

FIG. 2 is a flowchart 200 illustrating a method for mitigating cyber threats using code fingerprinting according to an embodiment. In an embodiment, the method is performed by the fingerprinter 130, FIG. 1.

At S210, a computing environment to be protected is identified. The computing environment may be or may include, but is not limited to, a computing platform (e.g., the cloud computing platform 110, FIG. 1). The computing environment to be protected may be indicated in a request or otherwise selected by an entity looking to protect its systems and/or services from cyber threats.

At optional S220, a knowledge graph for the computing environment is created. In an embodiment, the knowledge graph includes nodes representing software components deployed in a computing environment such as, but not limited to, infrastructure as code (IaaC) components. In some alternative embodiments, S220 may include identifying an existing knowledge graph for the computing environment. In an embodiment, the knowledge graph may be created, or may be a knowledge graph which was created, as described further below with respect to FIG. 4.

At S230, fingerprinting code is generated based on a knowledge graph (e.g., the knowledge graph created at S220 or a knowledge graph identified with respect to a computing environment to be protected such as a knowledge graph including nodes representing entities among the computing environment). The fingerprinting code contains instructions that, when executed by a system, configure the system to search for instances of patterns (e.g., patterns in text such as particular text segments) corresponding to respective aspects of the knowledge graph and to generate statistical data about instances of the patterns found during the search. Accordingly, the fingerprinting code effectively encodes information represented in the knowledge graph.

In an embodiment, S230 includes querying the knowledge graph and identifying text segments among results for the query returned from the knowledge graph. The fingerprinting code may be generated, for example, based on metrics determined using the identified text segments. An example process for generating fingerprinting code is described further below with respect to FIG. 3.

In this regard, it is noted that generating the code using a knowledge graph as described herein effectively allows for automatically updating the fingerprinting code based on changes in the underlying computing environment or computing environments represented in the knowledge graph. That is, as entities within a computing environment change, the knowledge graph may be updated accordingly. Consequently, when the fingerprinting code is generated based on the updated knowledge graph, the fingerprinting code is also updated in accordance with the changes to the underlying computing environments. That is, the fingerprinting code can be recompiled, either periodically or as needed, and when such code is recompiled, the code is recompiled using the updated knowledge graph such that the instructions as executed are based on the updated knowledge graph. This further improves security by allowing the code to maintain an up-to-date status of relevant entities when scanning and creating fingerprints.

At S240, one or more code repositories are scanned by running the fingerprinting code. In an embodiment, S240 includes executing instructions of the fingerprinting code. As noted above, the fingerprinting code contains instructions for identifying instances of patterns corresponding to different aspects which may be of interest (e.g., aspects which the knowledge graph was queried for) and to generate statistics about those identified instances of patterns. Results of the scanning are utilized to generate statistics vectors such as, but not limited to, counts vectors, which can be utilized as fingerprints and analyzed in order to detect anomalous behavior or configurations. In an embodiment, the scanning includes performing a text search for predetermined portions of text (e.g., predetermined strings) in the code repositories.

At S250, statistics vectors are generated. Different statistics among the statistical data collectively define a fingerprint which can be analyzed and compared to other fingerprints in order to, for example, detect anomalous behavior. To this end, in an embodiment, the statistical vectors may be realized as counts vectors, where each counts vector includes a set of values representing aspects of nodes among the knowledge graph. Each counts vector therefore effectively embeds all or part of a code repository into vector space, and may therefore serve as a fingerprint unique to that code repository defined with respect to particular aspects which may be reflected in data among that code repository. In other words, in accordance with various disclosed embodiments, the fingerprints may be realized as these statistics vectors, where each statistics vector includes multiple statistical metrics (e.g., counts) representing respective data related to appearances of different aspects of scanned repository data (e.g., counts of numbers of instances of certain file extensions appearing).

In an embodiment, the statistics vectors include values representing statistics relating to occurrences of certain strings or other text segments which can be found via a simple text pattern search. In a further embodiment, the values of the statistics vectors are counts of numbers of instances of text segments which were found by searching for those text segments in the code repositories. In other words, during the scanning, a text search is performed in order to identify instances of certain strings or other text segments, and a count is determined as the number of times each string or portion of text was observed (i.e., a number of instances of that string or portion of text). Each counts vector (i.e., each statistics vector) may therefore be realized as a vector including values representing respective counts of respective text segments or other portions of text.

Because the counts vectors are based on counts of text segments, the counts vectors may be created by performing a simple text search rather than, for example, parsing code, querying a large language model (LLM), and the like. Moreover, when counts vectors are used for statistics, the statistics may be stored via incrementing counts in memory rather than writing entirely new entries in databases, which would utilize more computing resources than incrementing counters. Consequently, creating statistics vectors by counting instances of portions of text found using such text searches (i.e., by adding to counters in the computer's memory) may be performed much faster than other ways of creating fingerprints and requires fewer computing resources.

At optional S260, the statistics vectors are clustered. In an embodiment, the statistics vectors are clustered with respect to groupings of software components such that counts or other statistics vectors of software components belonging to the same group are clustered together. As a non-limiting example, software components may be grouped by developer (i.e., such that software components made by or otherwise put out by the same developer are grouped together), by source or location (e.g., such that software components stored in the same code repository are grouped together), both (e.g., per developer in each repository), and the like. The clusters may be utilized to determine aggregated statistics vectors (e.g., by summing counts of corresponding values between statistics vectors).

At optional S270, a machine learning model is applied to the statistics vectors. In an embodiment, the machine learning model is an anomaly detection model trained to detect anomalies based on input statistics vectors including statistical values representing certain conditions. Non-limiting example machine learning models that may be utilized as an anomaly detection model may include isolation forest models, local outlier factor models, robust covariance models, support vector machines (SVMs, e.g., one class SVMs), and the like.

In an embodiment, the machine learning model is trained based on a training set including training statistics vectors for respective entities represented in a knowledge graph. In a further embodiment, the machine learning model is trained based on training clusters of statistics vectors, and the inputs to the machine learning when applied include the clusters of statistics vectors created at S260. In such embodiments, the machine learning model may be applied to aggregated statistics vectors created by summing or otherwise combining values of respective statistics in different statistics vectors belonging to the same cluster (e.g., by summing counts of instances of respective text segments found for different software components represented by respective statistics vectors that belong to the same developer). As a non-limiting example, when a statistics vector for a first software component is (1, 2, 3) where (1, 2, 3) are counts of respective text segments in data related to the first software component and a statistics vector for a second software component is (4, 5, 6) where (4, 5, 6) are counts of the same respective text segments in data related to the second software component, an aggregated statistics vector for the first and second software components would be (5, 7, 9) (i.e., 1+4, 2+5, and 3+6).

At S280, one or more anomalies are detected. In an embodiment, the anomalies are detected as or based on outputs of the machine learning model when the machine learning model has been applied to the statistics vectors. As noted above, the machine learning model may be an anomaly detection model. Such anomaly detection models may be trained and configured to determine when values (e.g., values of statistics vectors) differ from a baseline above a threshold, thereby constituting an anomaly. Such difference may be determined, for example, based on distances between vectors or otherwise based on differences across expected or otherwise learned values. Thus, applying the machine learning model allows for determining when a fingerprint including statistics representing behavior in the computing environment is anomalous as compared to fingerprints represented during training, thereby detecting anomalous behavior via differences in fingerprints created as statistics vectors as described herein.

At S290, one or more remedial actions are performed. The remedial actions may include, but are not limited to, generating and sending a notification, performing mitigation actions such as changing configurations of software components, changing code of software components, combinations thereof, and the like. As a non-limiting example, a configuration of a software component may be changed from "allow" to "deny" with respect to a particular capability of the software component, thereby mitigating potential cyber threats.

When the remedial action includes generating a notification, S290 may further include determining to which person the notification should be sent. In implementations where the entity graph includes nodes representing code owners, such person to which the notification should be sent may be a person, team, business unit, and the like, represented by a node linked to the root cause entity in the entity graph. As noted above, by using known links between software components and code owners, an appropriate person to investigate or fix an issue can be automatically and accurately identified.

It should be noted that FIG. 2 is described with respect to identifying anomalies using the statistics vectors as fingerprints but that, in at least some implementations, the fingerprints may also be utilized for other purposes. Such purposes may include, but are not limited to, data science research endeavors utilized to learn more about activities or other behaviors within a computing environment. As non-limiting examples, the statistics vectors may be utilized to group source code management (SCM) repositories, to group developers (e.g., users who committed code to the repositories), to classify or compare SCM repositories, to identify certain entities (e.g., SCM repositories, commits, files, or users) or entities meeting certain criteria such as entities related to IaC or entities related to certain vulnerabilities, to identify and classify developers (e.g., to determine who are professional devOps engineers in an organization), combinations thereof, and the like. The fingerprints realized via statistics vectors may be compared and/or contrasted in order to determine similarities and differences between entities in order to identify commonalities between those entities.

Figure 3:
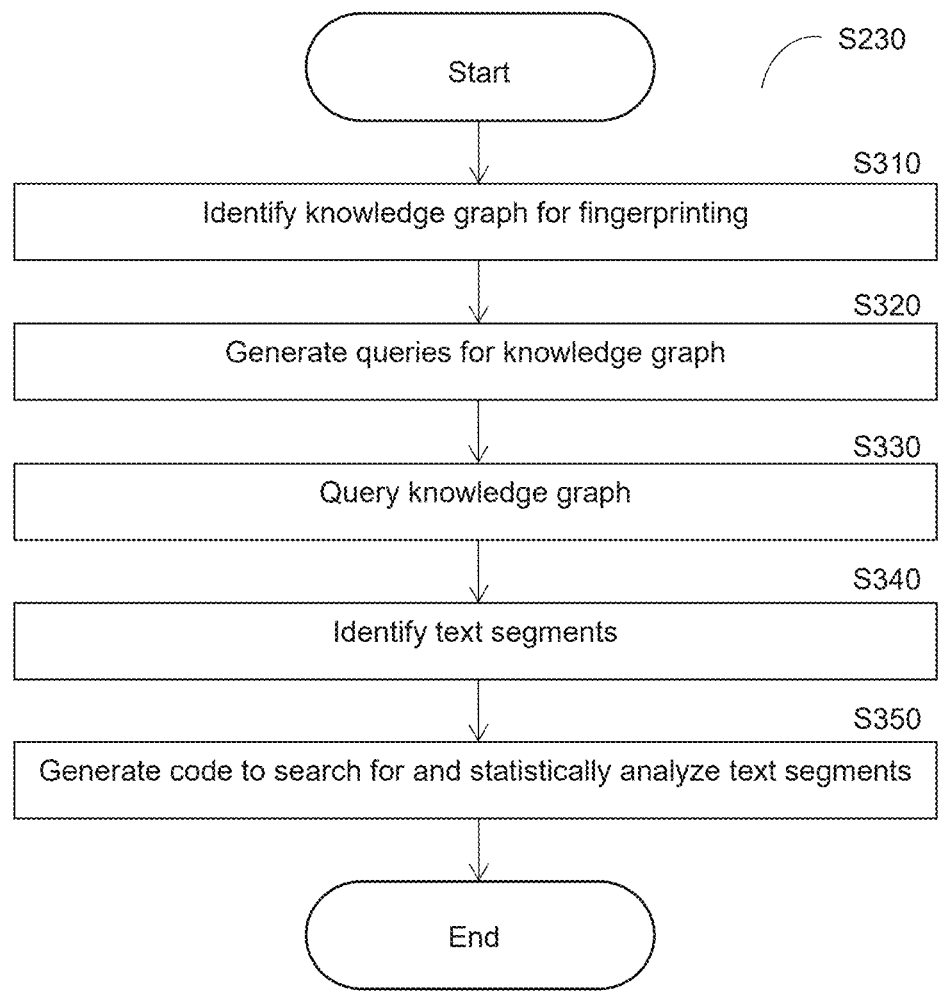
FIG. 3 is a flowchart illustrating a method for generating fingerprinting code according to an embodiment.

FIG. 3 is a flowchart S230 illustrating a method for generating fingerprinting code according to an embodiment.

At S310, a knowledge graph to be used for fingerprinting is identified. The knowledge graph may be or may include a knowledge graph created as described below with respect to FIG. 4. More specifically, the knowledge graph identified at S310 is a knowledge graph representing a computing environment to be protected or otherwise including nodes representing software components or other software entities of a computing environment to be protected (e.g., the computing environment identified as discussed with respect to S210, FIG. 2).

In accordance with various disclosed embodiments, the knowledge graph may include nodes representing various software concepts such as, but not limited to, "webdev," "devops," "data science," and the like, which are connected to nodes representing respective software components. Accordingly, fingerprinting by creating statistics vectors including values representing counts of text segments related to these software concepts (e.g., the text segments "webdev," "devops," and/or "data science"), repositories may be analyzed to determine how much or how little they relate to these software concepts by assigning quantifications of instances of these software concepts (e.g., based on counts of text segments corresponding to these concepts). As a non-limiting example, it may be determined whether a given repository is "highly devops related" or "not very related to data science." The queries for these concepts may be automated by beginning with queries for software components meeting certain criteria represented in the knowledge graph, where the knowledge graph links nodes representing such software components to nodes representing software concepts.

By querying a knowledge graph using certain criteria related to software components, relevant software development concepts may be automatically identified and quantified for purposes of establishing meaningful fingerprints as described herein. This is contrasted with searching for any software concepts represented in the knowledge graph, which may be present but may not provide meaningful information for certain use cases (e.g., use cases related to software components meeting certain criteria). Accordingly, querying the knowledge base for linked entities in this manner may also allow for reducing the number of statistical values included in each statistical vector in order for that statistical vector to serve as an effective fingerprint for accurate anomaly detection, thereby conserving computing resources.

At S320, queries are generated for the knowledge graph. The queries are for one or more attributes or other characteristics of interest represented in the knowledge graph and, in particular, attributes or characteristics which are represented by respective text segments such that results returned by the knowledge graph in response to the query may be analyzed in order to determine statistics related to instances of those text segments included among the results returned by the knowledge graph. The attributes of interest may differ depending on the use case and may be predetermined or otherwise selected and provided for use in query generation.

In an embodiment, the attributes of interest include attributes of files such as, but not limited to, types of files (e.g., backend development, frontend development, configuration, containers, continuous integration/continuous development [CI/CD]), types of infrastructure as code (IaC) solutions the files are used for (e.g., respective brands of IaC solutions or other categories of IaC tools), types of command line interfaces used with the files (e.g., CI/CD deployment command line interfaces, cloud interface command line interfaces, etc.), file extensions (e.g., ".tf", ".js", ".yaml", ".md", "class", etc.), combinations thereof, portions thereof, and the like.

In an embodiment, the generated queries are defined with respect to one or more development operation (devOps) concepts such as, but not limited to, infrastructure as code (IaC), front end development, back end development, configuration, and the like.

As a non-limiting example, attributes of interest may include file extensions and their respective devOps concepts. In particular, according to this example, the file extensions of interest include ".tf", ".js", and "yaml." In such an example, the knowledge base may be queried using one or more queries indicating these particular file extensions, and may further request any devOps concepts linked to entities having these file extensions (i.e., devOps concepts represented as nodes linked to nodes representing the entities having these file extensions in the knowledge graph).

At S330, the knowledge graph is queried using the generated queries. As noted above, the query may be related to certain attributes such that the query may be utilized to obtain data of nodes representing entities having those attributes, nodes of entities which are connected to the nodes representing entities having those attributes, both, and the like. When such a query is provided to a service or system storing the knowledge graph, such a service or system may return results including nodes representing those file extensions and nodes representing devOps concepts linked to the returned file extension nodes. Such nodes may store textual content related to their respective entities that may be textually analyzed in order to count instances of certain text segments as described herein.

As a non-limiting example, the knowledge graph may be queried for nodes representing software components having the file extension ".tf", ".js", or "yaml", as well as for any nodes of devOps concept entities linked to nodes representing software components having any of those file extensions. In response, the knowledge base returns data at least including textual content describing or otherwise related to the software components having those file extensions as well as related devOps concepts.

At S340, text segments are identified among the results returned by the knowledge graph. As noted above, the results returned by the knowledge graph may include textual content described respective entities represented by nodes in the knowledge graph. The text segments identified at S340 may be or may include text segments meeting certain predetermined criteria. To this end, in a further embodiment, S340 includes applying predetermined text segment identification rules which define such criteria.

At S350, code for searching and analyzing the text segments is generated. In an embodiment, the code includes instructions that, when executed by a processing circuitry, cause the processing circuitry to perform such searching and static analysis of the text segments. More specifically, the code includes instructions for counting or otherwise determining statistical metrics related to text segments such as, but not limited to, incrementing a counter for a respective type of file extension when each respective type of file extension is encountered during the scanning.

In a further embodiment, generating the code includes applying predetermined code generation rules based on query results from querying the knowledge graph. As a non-limiting example, when the knowledge graph is queried with respect to different types of file extensions, the code generation rules may include rules defining that a counter is increased when each type of file extension indicated in the query or among the query results is encountered.

Figure 4:
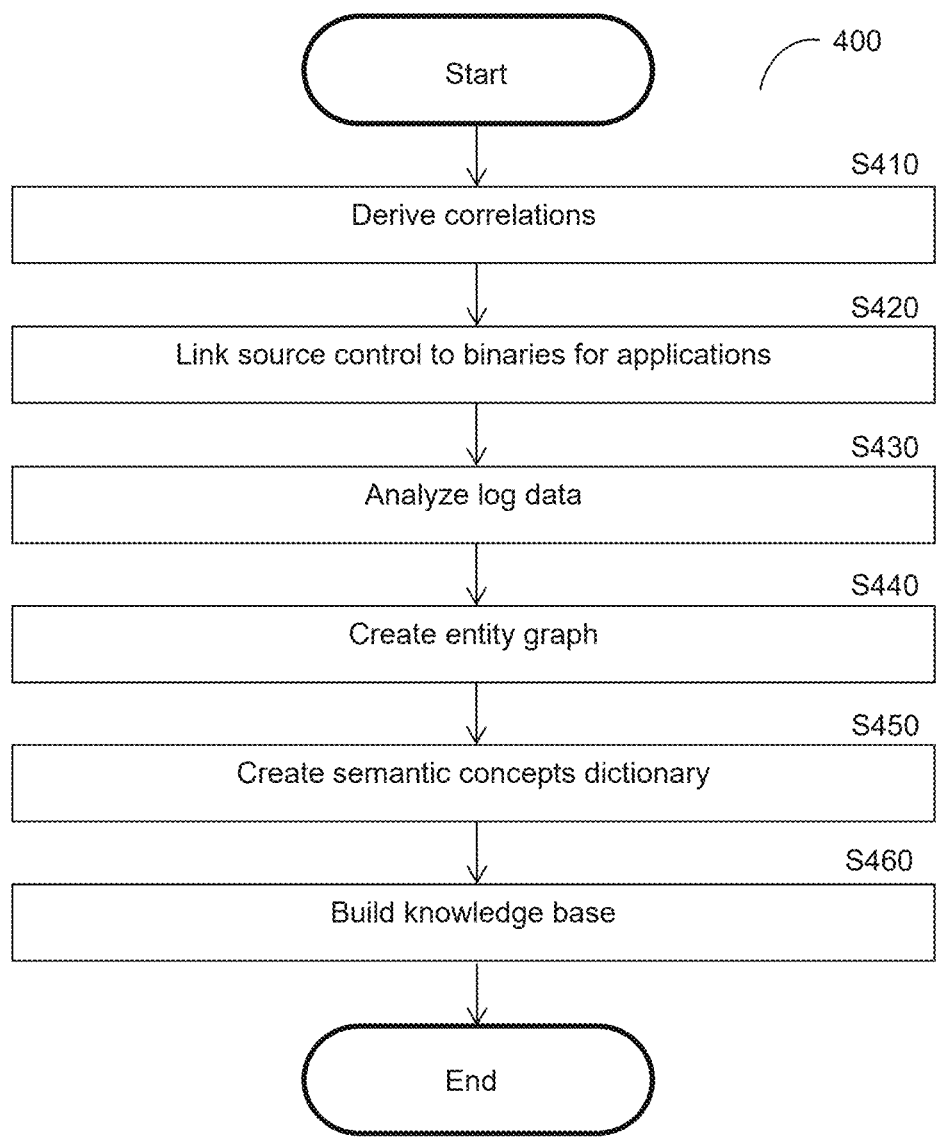
FIG. 4 is a flowchart illustrating a method for creating a knowledge base for use in fingerprinting which may be utilized in accordance with various embodiments.

FIG. 4 is a flowchart 400 illustrating a method for creating a knowledge base of semantic concepts and entity-identifying values according to an embodiment. In an embodiment, the method is performed by the knowledge base architect 140, FIG. 1.

At S410, correlations between software components are derived by analyzing software development lifecycle (SDLC) pipeline data (e.g., data of a continuous integration [CI] and continuous delivery [CD] pipeline). Such SDLC data may include, but is not limited to, a pipeline configuration, build scripts, source code, combinations thereof, portions thereof, and the like. The correlations are identified based on references between software components indicated in such data, static analysis of software components, semantic analysis of text related to the software components, combinations thereof, and the like.

At S420, source control is linked to binaries of one or more applications based on the derived correlations. In an embodiment, S420 includes extracting uniquely identifying features of the source control artifact and binaries from the analyzed data. In a further embodiment, the linking is limited to pairs of binaries and source control artifacts selected from limited set of binaries and source control artifacts, respectively.

At S430, log data (e.g., log files) is analyzed for additional correlations. To this end, S430 may include identifying actions taken by software components and events which may be caused by those actions. These relationships may be identified based on circumstances such as, but not limited to, events occurring shortly after those actions, determinations that events which could logically have been caused by the actions, combinations thereof, and the like. The identification of S430 may be based on probabilistic analysis such that, for example, correlations having likelihoods above a threshold are identified.

As a non-limiting example, by analyzing log files from an integration or deployment server, links between code commits and binary hashes (and, consequently, the corresponding entities involved) may be identified. As another non-limiting example, by analyzing of files in a cloud environment, information identifying entities used by automation engines may be identified.

In this regard, it has been identified that correlations indicated between log files can demonstrate that particular deployments occurred previously, which in turn aids in providing visibility to the DevOps pipeline in situations where static analysis will not satisfy the constraints, and may further aid in finding hidden automation. This, in turn, provides additional information about relationships between software components and entity logic components which can be utilized in some non-limiting examples to more accurately identify root causes.

At S440, an entity graph is created based on the correlations identified at S410 through S430. The entity graph includes nodes and edges. The nodes represent distinct logical entities such as, but not limited to, software components, event logic components, and the like. The edges connect entities based on the correlations identified at S410 through S430. The edges therefore represent relationships between pairs of entities, which in turn form paths as one navigates from a first entity to a second, from the second to a third, and so on. The paths following edges between nodes may therefore be utilized to identify connections between different entities (e.g., between event logic components and software components), thereby allowing for automatically and objectively identifying root causes of cybersecurity events.

In some embodiments, S440 further includes incorporating translated entity-defining datasets into the entity graph. To this end, in such embodiments, S440 includes embedding translated data into the entity graph, and S440 may further include performing such translation. The entity-defining datasets provide explicit definitions of features of potential entities to be included in the entity graph. As a non-limiting example, such a dataset may be a schema of a DevOps tool (e.g., Terraform) that defines the function performed by each portion of the tool. Further incorporating such explicitly-defined features allows for further increasing the granularity of the graph, thereby further improving applications of said graph in identifying connections between cybersecurity event data and event logic components.

At S450, a semantic concepts dictionary is created. The semantic concepts dictionary may be populated with predetermined semantic concepts. The semantic concepts indicate potential characteristics of entities in the entity graph such as, but not limited to, type (e.g., "Docker container"), potential identifiers (e.g., an Internet Protocol address), build automation, configuration, portions thereof, combinations thereof, and the like. Such semantic concepts provide additional information regarding entities which may be used to improve the accuracy of root cause identification by providing additional identifying data for entities that can be queried. These semantic concepts indicating potential characteristics of entities may be included as nodes in the entity graph, or may be included in data of nodes of the entity graph.

At S460, a knowledge base is built. The knowledge base includes the entity graph and the semantic concepts dictionary.

Once built, the knowledge base can be queried as described herein (for example, as discussed with respect to FIG. 3) in order to determine connections between software components and cybersecurity events or potential cybersecurity events, thereby providing context related to cybersecurity events and allowing for automatically suggesting remedial actions to address cybersecurity events based on such contexts. In particular, the knowledge base may return textual content in response to queries, which can be analyzed with respect to text segments contained therein in order to generate fingerprints as discussed above.

It should be noted that the steps of FIG. 4 are depicted in a particular order, but that the steps are not necessarily limited to the order depicted. As a non-limiting example, the semantic concepts dictionary may be created before or in parallel with any of the steps S310 through S340 without departing from the scope of the disclosure.

Figure 5:
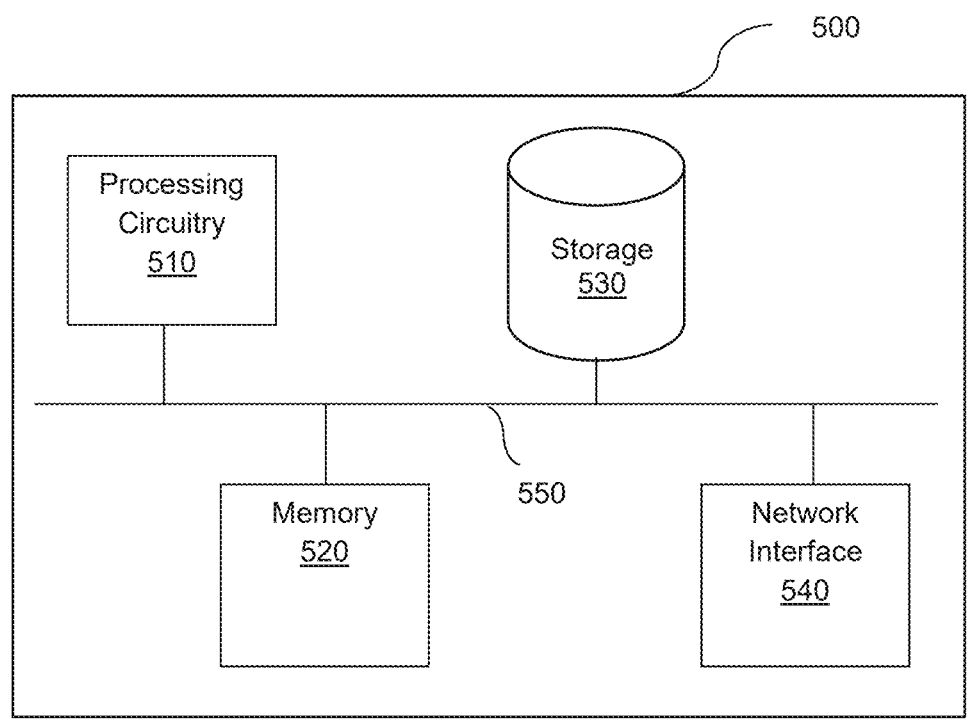
FIG. 5 is a schematic diagram of a fingerprinter according to an embodiment.

FIG. 5 is an example schematic diagram of a hardware layer 500 according to an embodiment. The hardware layer 500 includes a processing circuitry 510 coupled to a memory 520, a storage 530, and a network interface 540. In an embodiment, the components of the hardware layer 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the hardware layer 500 to communicate with, for example, the production servers 112, the scanners 115, the knowledge base 120, and the like.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for anomaly remediation, comprising:
    scanning a code repository including a plurality of software components by executing fingerprinting code on the code repository in order to generate a plurality of statistics vectors for the plurality of software components, wherein each statistics vector includes a plurality of values representing statistics for respective aspects of a corresponding software component of the plurality of software components, wherein the fingerprinting code includes instructions that configure a processing circuitry to perform a text search in order to identify instances of patterns in the code repository and to generate the plurality of statistics vectors based on the identified instances of patterns when the fingerprinting code is executed;
    clustering the plurality of statistics vectors into a plurality of clusters defined with respect to a plurality of software component groupings, wherein each cluster of the plurality of clusters includes a subset of the plurality of statistics vectors of corresponding to a subset of the plurality of software components which belongs to one of the plurality of software component groupings;
    aggregating the plurality of statistics vectors into a plurality of aggregated statistics vectors by combining values of respective statistics in statistics vectors among the plurality of statistics vectors belonging to a same cluster of the plurality of clusters;
    detecting at least one anomaly based on the plurality of aggregated statistics vectors; and
    performing at least one remedial action with respect to the plurality of software components based on the detected at least one anomaly.

2. The method of claim 1, wherein the fingerprinting code is generated based on a knowledge base including a plurality of nodes representing respective software components of the plurality of software components, wherein the patterns are defined with respect to the knowledge base.

3. The method of claim 2, further comprising:
    querying the knowledge base in order to obtain query results; and
    generating the fingerprinting code is based on the query results.

4. The method of claim 2, wherein the knowledge base is queried for at least one string of text of the plurality of nodes of the plurality of software components represented in the knowledge base, wherein the patterns are defined with respect to the at least one string of text.

5. The method of claim 2, wherein the knowledge base is queried in a first query, wherein the query results are a first set of query results, wherein the plurality of statistics vectors is a first plurality of statistics vectors, wherein the at least one anomaly is at least one first anomaly, further comprising:
    updating the fingerprinting code by querying the knowledge base in a second query in order to obtain a second set of query results and regenerating the fingerprinting code based on the second set of query results;
    scanning the code repository using the updated fingerprinting code in order to generate a second plurality of statistics vectors; and
    detecting at least one second anomaly based on the second plurality of statistics vectors.

6. The method of claim 2, wherein the knowledge base includes data of code of the plurality of software components, wherein the patterns are defined further with respect to the data of the code of the plurality of software components.

7. The method of claim 1, wherein the patterns are patterns in text, wherein the fingerprinting code includes instructions that, when executed by a processing circuitry, configure the processing circuitry to perform at least one text search.

8. The method of claim 1, wherein the plurality of statistics vectors include a plurality of counts vectors, wherein each of the plurality of values of each counts vector is a count of instances for a respective aspect of the plurality of software components represented in a knowledge base.

9. The method of claim 1, further comprising:
    applying a machine learning model to the plurality of aggregated statistics vectors in order to obtain a set of machine learning model outputs, wherein the machine learning model is trained using training statistical data for a knowledge base including a plurality of nodes representing respective software components of the plurality of software components, wherein the machine learning model is trained to output anomalies when applied to the plurality of aggregated statistics vectors, wherein the at least one anomaly is detected based on the set of machine learning model outputs.

10. A non-transitory computer readable medium having stored thereon instructions for causing a processing circuitry to execute a process, the process comprising:
    scanning a code repository including a plurality of software components by executing fingerprinting code on the code repository in order to generate a plurality of statistics vectors for the plurality of software components, wherein each statistics vector includes a plurality of values representing statistics for respective aspects of a corresponding software component of the plurality of software components, wherein the fingerprinting code includes instructions that configure a processing circuitry to perform a text search in order to identify instances of patterns in the code repository and to generate the plurality of statistics vectors based on the identified instances of patterns when the fingerprinting code is executed;

clustering the plurality of statistics vectors into a plurality of clusters defined with respect to a plurality of software component groupings, wherein each cluster of the plurality of clusters includes a subset of the plurality of statistics vectors of corresponding to a subset of the plurality of software components which belongs to one of the plurality of software component groupings;

aggregating the plurality of statistics vectors into a plurality of aggregated statistics vectors by combining values of respective statistics in statistics vectors among the plurality of statistics vectors belonging to a same cluster of the plurality of clusters;

detecting at least one anomaly based on the plurality of aggregated statistics vectors; and performing at least one remedial action with respect to the plurality of software components based on the detected at least one anomaly.

11. A system for anomaly remediation, comprising:

a processing circuitry; and a memory, the memory containing instructions that, when executed by the processing circuitry, configure the system to:

scanning a code repository including a plurality of software components by executing fingerprinting code on the code repository in order to generate a plurality of statistics vectors for the plurality of software components, wherein each statistics vector includes a plurality of values representing statistics for respective aspects of a corresponding software component of the plurality of software components, wherein the fingerprinting code includes instructions that configure a processing circuitry to perform a text search in order to identify instances of patterns in the code repository and to generate the plurality of statistics vectors based on the identified instances of patterns when the fingerprinting code is executed;

clustering the plurality of statistics vectors into a plurality of clusters defined with respect to a plurality of software component groupings, wherein each cluster of the plurality of clusters includes a subset of the plurality of statistics vectors of corresponding to a subset of the plurality of software components which belongs to one of the plurality of software component groupings;

aggregate the plurality of statistics vectors into a plurality of aggregated statistics vectors by combining values of respective statistics in statistics vectors among the plurality of statistics vectors belonging to a same cluster of the plurality of clusters;

detect at least one anomaly based on the plurality of aggregated statistics vectors; and perform at least one remedial action with respect to the plurality of software components based on the detected at least one anomaly.

12. The system of claim 11, wherein the fingerprinting code is generated based on a knowledge base including a plurality of nodes representing respective software components of the plurality of software components, wherein the patterns are defined with respect to the knowledge base.

13. The system of claim 12, wherein the system is further configured to:

query the knowledge base in order to obtain query results; and generate the fingerprinting code is based on the query results.

14. The system of claim 12, wherein the knowledge base is queried for at least one string of text of the plurality of nodes of the plurality of software components represented in the knowledge base, wherein the patterns are defined with respect to the at least one string of text.

15. The system of claim 12, wherein the knowledge base is queried in a first query, wherein the query results are a first set of query results, wherein the plurality of statistics vectors is a first plurality of statistics vectors, wherein the at least one anomaly is at least one first anomaly, wherein the system is further configured to:

update the fingerprinting code by querying the knowledge base in a second query in order to obtain a second set of query results and regenerating the fingerprinting code based on the second set of query results;

scan the code repository using the updated fingerprinting code in order to generate a second plurality of statistics vectors; and detect at least one second anomaly based on the second plurality of statistics vectors.

16. The system of claim 12, wherein the knowledge base includes data of code of the plurality of software components, wherein the patterns are defined further with respect to the data of the code of the plurality of software components.

17. The system of claim 11, wherein the patterns are patterns in text, wherein the fingerprinting code includes instructions that, when executed by a processing circuitry, configure the processing circuitry to perform at least one text search.

18. The system of claim 11, wherein the plurality of statistics vectors include a plurality of counts vectors, wherein each of the plurality of values of each counts vector is a count of instances for a respective aspect of the plurality of software components represented in a knowledge base.

19. The system of claim 11, wherein the system is further configured to:

apply a machine learning model to the plurality of aggregated statistics vectors in order to obtain a set of machine learning model outputs, wherein the machine learning model is trained using training statistical data for a knowledge base including a plurality of nodes representing respective software components of the plurality of software components, wherein the machine learning model is trained to output anomalies when applied to the plurality of aggregated statistics vectors, wherein the at least one anomaly is detected based on the set of machine learning model outputs.

* * * * *